Aug. 5, 1958
P. A. DERHAM
2,845,748
PLASTIC TOY AND FLEXIBLE PLASTIC
UNIT FOR TOYS AND OTHER ARTICLES
Filed Feb. 4, 1957
2 Sheets-Sheet 1
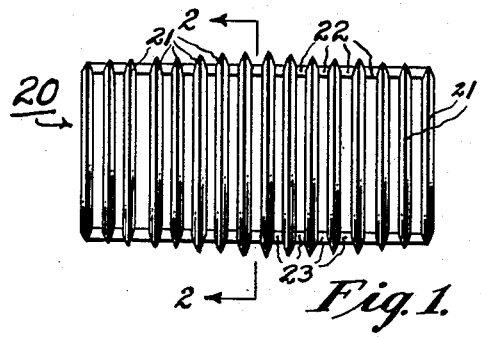
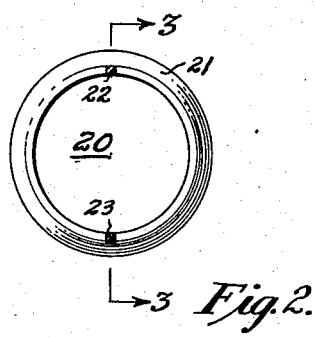
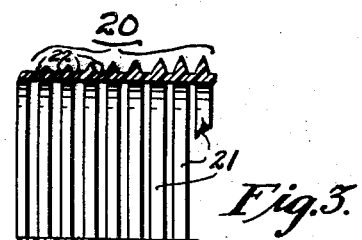
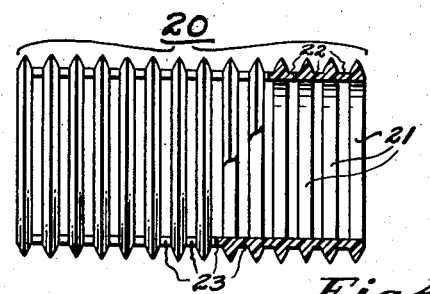
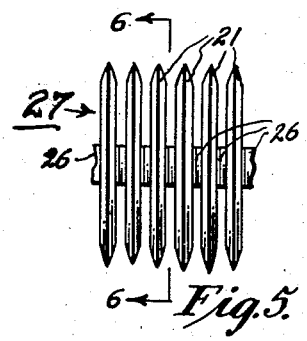
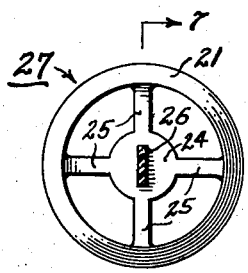
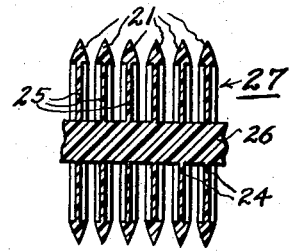
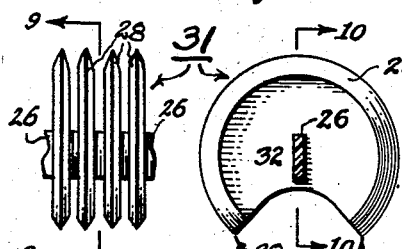
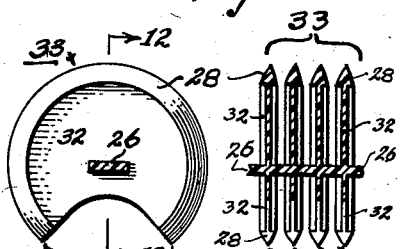
INVENTOR.
PHILIP A. DERHAM
BY Leonard L. Kalish
ATTORNEY.

Aug. 5, 1958     P. A. DERHAM     2,845,748
PLASTIC TOY AND FLEXIBLE PLASTIC
UNIT FOR TOYS AND OTHER ARTICLES

Filed Feb. 4, 1957     2 Sheets-Sheet 2

INVENTOR.
PHILIP A. DERHAM
BY
*Leonard L. Kalish*
ATTORNEY.

United States Patent Office 2,845,748
Patented Aug. 5, 1958

2,845,748

PLASTIC TOY AND FLEXIBLE PLASTIC UNIT FOR TOYS AND OTHER ARTICLES

Philip A. Derham, Audubon, Pa., assignor to Wilkening Manufacturing Company, a corporation of Delaware Application February 4, 1957, Serial No. 638,076

9 Claims. (Cl. 46—152)

The present invention relates to a certain known useful toy and certain improvements in toys, and more particularly pull toys simulating some animate or inanimate object whose simulated body is formed in sections, with successive sections flexibly connected.

In my co-pending application, Serial No. 512,955, filed June 3, 1955, I have disclosed a pull toy in which the successive sections, preferably made of plastic, are interconnected by means of helical metallic springs.

One object of the present invention is a pull-toy in which a plastic body member is formed of narrow disc-like, rib-like, rim like or ring-like closely spaced-apart sections flexibly interconnected by integral connective portions which permit the narrow sections to angle in respect to each other, to a limited extent, about any selected axis or axes of pivotation or to angle or tilt universally in respect to each other (to a predetermined limiting angle).

In another aspect, the present invention also consists of a flexible form-retaining or form-recovering plastic unit which may be a component of a toy or other object, such unit or component consisting of a plurality of closely placed (but spaced apart) ring-like or disc-like plastic elements with connective portions therebetween and integral therewith, permitting such ring-like or disc-like elements to angle in respect to each other within a limited angle, so that the unit can flex in a snake-like manner in any one or more planes.

In the accompanying drawings, in which like reference characters indicate like reference parts.

Figure 1 represents a side elevational view of a flexibly segmented unit or component 20 embodying the phase of the present invention, in which the successive ring-like or disc-like elements 21 are connected by a pair of opposed outer flexible form-restoring connectors 22 and 23 integral with the segments 21 at or near their outer peripheries (as shown in Figure 2) for permitting the segments to angle in respect to each other in a generally horizontal plane or on generally vertical axes of pivotation; although by turning this unit or component 90° about its over-all fore-and-aft axis, the flexibility will be in a vertical plane about horizontal axes of pivotation, in which event Figure 1 would be a top plan view rather than an elevational view.

Figure 2 represents a cross-sectional view on line 2—2 of Figure 1.

Figure 3 represents a cross-sectional view on line 3—3 of Figure 2.

Figure 4 represents a view similar to that shown in Figure 1, but with the sections or segments 21 of uniform diameter (as distinguished from the varying diameters, as shown in Figures 1 and 3), and shown partially in cross-section, similar to the sectional view which is Figure 3, namely, with the section taken through the connectors.

Figure 13:
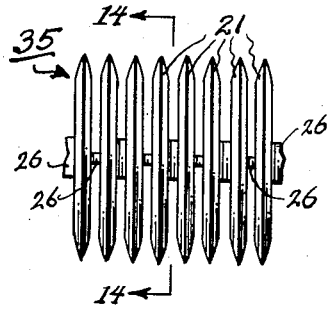

Figure 5 represents a view similar to that shown in Figure 1, of a fragmentary portion of a flexible unit or component 27 of a modified form of construction, namely, in which the segments 21 are provided with central or inner hub-like portions 24 suitably connected to the ring-like segments 21 by thin spokes or thin webs 25 by inner connectors 26.

Figure 6 represents a cross-sectional view on line 6—6 of Figure 5.

Figure 7 represents a cross-sectional view on line 7—7 of Figure 6.

Figure 8 represents a view similar to that shown in Figure 5, of another modified embodiment of the present invention, namely, in which the sections or segments 28 have interrupted peripheries so as to permit the sections or segments to contact a floor or other supporting surface with basal contacts which will maintain the discs in a predetermined position and prevent their rolling over.

Figure 9 represents a cross-sectional view on line 9—9 of Figure 8.

Figure 10 represents a cross-sectional view on line 10—10 of Figure 9.

Figure 11 represents a view similar to that shown in Figure 9, but with the connectors 26 at 90° to their position shown in Figures 8 to 10.

Figure 12 represents a cross-sectional view on line 12—12 of Figure 11.

Figure 13 represents a view similar to that shown in Figures 5 and 8, but with alternate connectors 26 at a right angle to each other, so as to provide angling between successive ring-like or disc-like segments 21 about two different axes, namely alternatively about vertical and horizontal axes.

Figure 14:
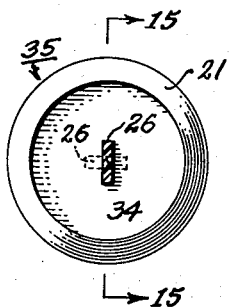

Figure 14 represents a cross-sectional view on line 14—14 of Figure 13.

Figure 15:
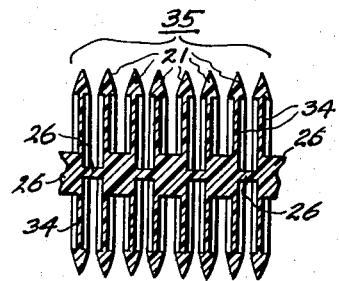

Figure 15 represents a cross-sectional view on line 15—15 of Figure 14.

Figure 16:
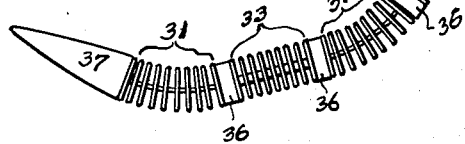
Figure 18:
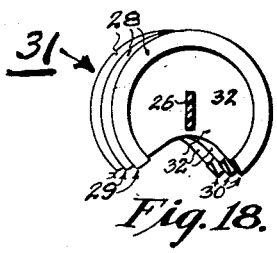
Figure 19:
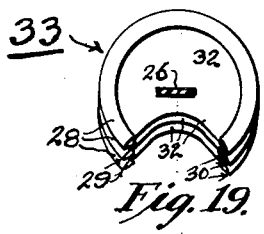

Figure 16 represents a top plan view of a toy, in a nature of a simulated snake, formed of a successive series of the aforementioned flexible units or components, with the ends of the components affixed (by adhesive or by fusing (31 and 33) or otherwise) to intermediate members 36 and with a simulated head 38 likewise affixed to the free end of one of the flexible components 33 and with a tail member 37 similarly affixed to the free end of the components 31 at the other end; alternate components having their connectors 26 vertically and horizontally disposed (as in Figures 8–10 and 18, and as in Figures 11, 12 and 19, respectively).

Figure 17:
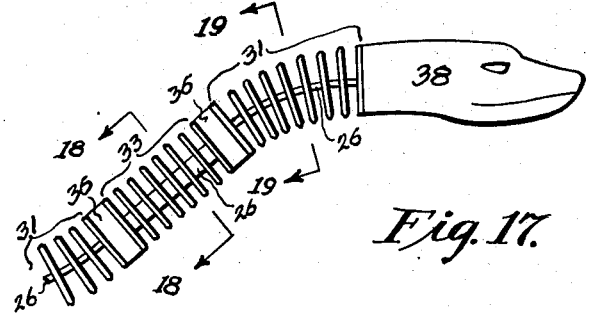

Figure 17 represents a fragmentary side elevational view of the toy shown in Figure 16, viewed generally along line 17—17 of Figure 16.

Figure 18 represents a perspective view generally on line 18—18 of Figure 17.

Figure 19 represents a perspective view generally on line 19—19 of Figure 17.

In the embodiment shown in Figures 1 to 4, inclusive, the flexible unit 20 is composed of a series of ring-like or annulus-shaped members or segments 21 and small flexible self-restoring connectors 22 and 23 between the successive rings 21, spacing them apart and also permitting angling between them due to the flexibility of the connectors 22 and 23.

The flexible unit 20 is preferably made of a series of rings or segments 21 and the integral connectors 22 and 23, by injection-moulding (or otherwise forming) of a flexible or resilient though generally form-retaining and self-restoring deformable synthetic plastic or rubber-like composition or material, which can be distorted to a substantial extent and regain its original form at any desired rate of recovery when the distorting force is removed.

The polyethylene injection-moulding materials are particularly suitable for this purpose. Vinyl and other self-restoring deformable plastics and rubber-like compositions may also be used. In addition to injection-moulding, other moulding, casting or shaping methods may be used.

The ring-like segments may have any desired cross-section, as, for instance, more or less tri-angular in cross-section, as shown in Figures 3 and 4, with the apex of the triangle facing outwardly and with the base thereof constituting the inner surface of the ring and with these inner base-surfaces in alignment with each other, so that these base-surfaces of the rings will lie in the same cylinder when the rings are in axial alignment with each other, as, for instance, as shown in Figures 1 to 4.

In the embodiment shown in Figures 1 and 2, the outer diameters of the rings 21 are varied so that the outercost rings are of the smaller diameter, and so that the diameters of the rings 21 increase slightly and gradually towards the center of the unit 20 so that the over-all outside shape of the unit 20 is somewhat barrel-like.

In the embodiment shown in Figure 4, the outer diameters of the rings are uniform.

Instead of having a pair of outer connectors 22 and 23 (as shown in Figures 1 to 4), an integral hub-like portion 24 may be provided inside of each segment 21, connected with the outer periphery or ring 21 by means of thin integral spokes 25 or by a continuous or discontinuous thin integral web of the plastic. Between the hub-like portions 24, more or less central integral connectors 26 are provided. By having the central or inner connectors 26 so that they have a substantially greater dimension in one direction than in the other direction (as shown, for instance, in Figures 6, 9, 11, 14, 18 and 19), the angling or pivotation provided by such connectors, between such successive rings or segments 21, will be generally about an axis parallel to the greater of the two dimensions of the connector 26. Thus, for instance, the axis of pivotation or angling provided by the connectors 26 in the embodiment shown in Figures 5 to 7, will be along the line 7—7 of Figure 6, that is, the axes of pivotation will be vertical when the unit 27 is disposed as shown in Figures 5 to 7.

In Figures 8 to 10 another modified embodiment of the present invention is shown, in which the ring-like or disc-like segments, here designated by the numeral 28, are interrupted from point 29 to point 30, so that when these segments are in a vertical position, the points 29 and 30 serve as floor-contacts which prevent the disc from rolling on its periphery. In this embodiment, the unit or component, here designated generally by the numeral 31, is provided with a thin interior web 32, to which the connectors 26 are integrally connected, as indicated particularly in Figure 10.

In Figures 11 and 12 another modified embodiment of the present invention is shown, in which the unit is designated generally by the number 33. The unit 33 is similar to the unit 31 (as shown in Figures 8 to 10), but has its connectors 26 disposed parallel to the base-line connecting the base-points 29 and 30; whereas in the unit 31, shown in Figures 8 to 10, the connectors 26 are at a right angle to the base-line connecting the points 29 and 30. Thus, when resting on a floor or table surface, the unit 31 will flex in a horizontal plane, namely, about vertical axes of pivotation, while the unit 33, when similarly resting on a floor, on its base-points 29 and 30, will flex in a vertical plane manner, about horizontal axes of pivotation.

Universal connectors may also be used between the segments, as, for instance, single connectors, generally centered, and having a generally circular cross-section. Such universal connectors as well as the connectors 23 and 24 (and 26) may also be off-center (instead of centered, as shown in the drawings).

In the embodiment shown in Figures 13 to 15, inclusive, the ring-like members 21 have a more or less continuous internal web 34 therein, preferably quite thin. Alternate connectors 26 are disposed at right angles to each other, so that the unit, here designated generally by the numeral 35, will be flexible in two planes generally at right angles to each other (as indicated in Figures 13 to 15).

The toy shown in Figures 16 to 19 illustrates one toy embodiment of the present invention, in which the main body of the toy is made up of alternate components 31 and 33, secured to intervening members 36. The members 36 may be rings or discs formed of the same plastic (or may be a more rigid plastic) adhesively secured or fused to the end segments 28 of the adjacent flexible units 32 and 33. The rings 36 are also formed interruptedly, like the segments 28 in Figures 8 to 12 and 18 and 19, so as to provide base-contact points, or they may be merely flattened at the bottom, parallel to the base-lines connecting the points 29 and 30 in Figures 9 and 11.

To the end unit 32, a tail member 37 may be similarly secured. The tail member 37 may also be formed of the same plastic or of other suitable material. To the other terminal unit 33 a head 38 (of plastic or of other material) may be similarly secured.

The successive units 32 and 33 will flex in opposite directions, so as to give the toy undulating motions in two right angular planes when pulled across the floor. The base-contact points 29 and 30 provide sufficient friction between the toy and surface (floor, table or rug) over which the toy is pulled, so as to flex the toy at the aforementioned points of pivotation and to give it the undulating motion when pulled across such supporting surface.

Other toys, and indeed other objects, may be formed of the flexible units shown in Figures 1 to 15, inclusive.

By the relatively close spacing of the segments (21 or 28) to each other, a sufficent "solidity" is provided to give the visual effect of a "body," while at the same time permitting the unit (20, 27, 31, 33 or 35) to flex; the spacing being such as to limit the angling between adjacent segments.

The flexible units (20, 27, 31, 33 or 35) may also be used for connecting intervening sections of larger diameter, as, for instance, the wheeled sections, 10–a, 10–b, 10–c, and 10–d shown in the drawings of my co-pending application Serial No. 512,955, so that the toy will rest on such intervening wheeled sections, with the flexible unit (20, 27, 31, 33 or 35 of the present application) serving as intermediate undulating body-segments.

While in the drawings only circular (Figures 2, 6 and 14) and interrupted circular (Figures 9, 11, 18 and 19) segments are shown, I may make the segments any desired shape, as, for instance, oval-shaped, kidney-shaped, star-shaped, and any other shape.

The aforementioned segments present the appearance of rings, ribs or rims which are relatively thin in the axial or fore-and-aft direction of the flexible unit and which also have a relatively small radial dimension as contrasted with the diameter or radius of the segment; thereby giving a particular appearance to the flexible unit and to the toy of which it is a part. The radial width or thickness of the rib, rim or ring 21 is preferably a fraction of the radius of the segment as, for instance, less than a half or less than a third of such radius.

The reference to the radius of the segment or of the rib or rim is not intended to limit the segments to a circular form as in Figure 2 (for instance) or to segments having circular peripheries in part, as in Figures 9, 11, 18 and 19, because such segments may be of other shapes, as indicated hereinabove.

Likewise, the center of the segment (in case the segment does not have a circular periphery) may be merely the area center of the area encompassed within the outer periphery thereof or it may be intersection of the lines passing through the major and minor cross-dimensions (of the segment) normal to the axial or fore-and-aft direction of the flexible unit; and the axis of the flexible unit may be merely the line passing through such area-centers or cross-dimension-centers.

The connectors 22 and 23 (as will as the connector 26) are of substantial free length between adjacent segments, so as to permit adjacent segments hingedly to angle with respect to each other and to space adjacent segments with respect to each other, as indicated in Figures 1, 3–5, 7, 8, 10, 12, 13 and 15–17.

The term "rim," and the term "rim-like" as used in the claims, is intended to mean a peripheral member or portion having a relatively small radial dimension in respect to the major diameter or cross-dimension of the segment normal to the axial or fore-and-aft direction of the flexible unit.

I may also connect some of the adjacent segments by a helical web of sufficient radial dimension and sufficient thickness to support the adjacent segments in relation to each other and to permit them to move toward and away from each other, in axial alignment, in a spring-like manner. Thus, I may alternate such helical connectors with the pivotal connectors mentioned above, so that the unit will be resilient axially at certain points while hingedly connected at other points.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

I claim the following:

1. A flexible unit for toys and other articles and devices, formed of a generally form-retaining and self-restoring flexible non-metallic material, comprising a plurality of spaced-apart relatively narrow integral one-piece rib-like body-segments whose dimension in the axial direction of the flexible unit is substantially less than half its dimension transversely of such axial direction, at least one flexible self-restoring connector between some of the adjacent segments and integral therewith, with portions of the same segments being disposed on opposite sides of the connector, juxtaposed outer portions of adjacent segments being spaced from each other a distance not substantially more than a distance of the order of the length of the connector therebetween, thereby providing hinge-like angling between said segments of limited angle, with the connectors tending to restore the segments to their original positions in relation with each other.

2. A flexible unit for toys and other articles and devices, formed of a generally form-retaining and self-restoring flexible non-metallic material comprising a plurality of closely spaced-apart relatively narrow integral one-piece rib-like segments whose dimension in the axial direction of the flexible unit is less than half the overall major dimension of the segment transversely of such axial direction, said segments being recessed inwardly of their outer rib-like portions, at least one flexible self-restoring connector between adjacent segments and integral therewith and forming a connecting hinge therebetween; portions of the same segment being disposed on opposite sides of the connector.

3. A flexible unit for toys and other articles and devices, formed of a generally form-retaining and self-restoring flexible plastic, comprising a plurality of closely spaced-apart relatively thin integral one-piece disc-like body-segments whose dimension in the axial direction of the flexible unit is substantially less than a third of the overall major dimension of the segment transversely of such axial direction, at least one flexible self-restoring connector between adjacent segments and integral therewith and forming a connecting and self-restoring hinge therebetween, with portions of the same segment being disposed on opposite sides of the connector; the spacing between juxtaposed outer portions of adjacent segments farthest from said connector being generally of the order of the thickness of the segments in the aforementioned axial direction.

4. A flexible unit for toys and other articles and devices, formed of a generally form-retaining and self-restoring flexible non-metallic material, comprising a plurality of closely spaced-apart relatively narrow integral one-piece rim-like segments whose dimension in the fore-and-aft direction of the flexible unit is less than half the overall dimension of the segment normal to such direction, and two separate flexible self-restoring connectors of substantial free length between adjacent segments and integral therewith and spacing the segments in relation to each other and forming a connecting hinge therebetween for permitting the angling of adjacent segments in relation to each other, said two connectors being spaced apart from each other and being disposed at opposed portions of the segments.

5. A flexible unit for toys and other articles and devices, formed of a generally form-retaining and self-restoring flexible non-metallic material, comprising a plurality of closely spaced-apart relatively narrow integral one-piece rim-like hollow segments whose dimension in the fore-and-aft direction of the flexible unit is less than half the overall dimension of the segment normal to such direction, and two separate flexible self-restoring connectors of substantial free length between adjacent segments and integral therewith and spacing the segments in relation to each other and forming a connecting hinge therebetween for permitting the angling of adjacent segments in relation to each other, said two connectors being spaced apart from each other and being disposed at opposed portions of the segment, with portions of the same segment being disposed on opposite sides of the line passing through the two connectors.

6. A flexible unit for toys and other articles and devices, formed of a generally form-retaining and self-restoring flexible non-material, comprising a plurality of closely spaced-apart relatively narrow integral one-piece rim-like segments whose dimension in the fore-and-aft direction of the flexible unit is less than half and the thickness of whose rim is less than one-fourth the major overall dimension of the segment normal to the fore-and-aft direction of the flexible unit, and two flexible self-restoring connectors of substantial free length between adjacent segments and integral therewith and spacing the segments in relation to each other and forming a connecting hinge therebetween for permitting the angling of adjacent segments in relation to each other, with portions of the same segments being disposed on opposite sides of the conectors therebetween.

7. A toy including a flexible segmental unit and a contrasting member secured to each end thereof and capable of being deflected in relation to each other through the flexing of said flexible segmental unit therebetween, said flexible segmental unit being formed of a generally form-retaining and self-restoring flexible non-metallic material, comprising a plurality of closely spaced-apart relatively narrow integral one-piece rim-like segments whose dimension in the fore-and-aft direction of the flexible unit is less than half the overall dimension of the segment normal to such direction, and two separate flexible self-restoring connectors of substantial free length between adjacent segments and integral therewith and spacing the segments in relation to each other and forming a connecting hinge therebetween for permitting the angling of adjacent segments in relation to each other, said two connectors being spaced apart from each other and being disposed at opposed portions of the segment.

8. A toy including a flexible segmental unit and a contrasting member secured to each end thereof and capable of being deflected in relation to each other through the flexing of said flexible segmental unit therebetween, said flexible segmental unit being formed of a generally form-retaining and self-restoring flexible non-metallic material, comprising a plurality of closely spaced-apart relatively narrow integral one-piece rim-like hollow segments whose dimension in the fore-and-aft direction of the flexible unit is less than half the overall dimension of the segment normal to such direction, and two separate flexible self-restoring connectors of substantial free length between adjacent segments and integral therewith and spacing the segments in relation to each other and forming a connecting hinge therebetween for permitting the angling of adjacent segments in relation to each other, said two connectors being spaced apart from each other and being disposed at opposed portions of the segment, with portions of the same segment being disposed on opposite sides of the line passing through the two connectors.

9. A toy including a flexible segmental unit and a contrasting member secured to each end thereof and capable of being deflected in relation to each other through the flexing of said flexible segmental unit therebetween, said flexible segmental unit being formed of a generally form-retaining and self-restoring flexible non-metallic material, comprising a plurality of closely spaced-apart relatively narrow integral one-piece rim-like segments whose dimension in the fore-and-aft direction of the flexible unit is less than half and the thickness of whose rim is less than one-fourth the major overall dimension of the segment normal to the fore-and-aft direction of the flexible unit, and two flexible self-restoring connectors of substantial free length between adjacent segments and integral therewith and spacing the segments in relation to each other and forming a connecting hinge therebetween for permitting the angling of adjacent segments in relation to each other, with portions of the same segments being disposed on opposite sides of the connectors therebetween.

References Cited in the file of this patent

UNITED STATES PATENTS

| 857,593 | Brown | June 25, 1907 |
| 1,599,947 | Bishop | Sept. 14, 1926 |
| 1,788,798 | Lesot | Jan. 13, 1931 |
| 2,241,576 | Barton | May 13, 1941 |

FOREIGN PATENTS

| 666,033 | Germany | Oct. 11, 1938 |